United States Patent
Olausson et al.

(10) Patent No.: US 10,926,189 B2
(45) Date of Patent: Feb. 23, 2021

(54) HEAT TRANSFER TUBE AND METHOD FOR MANUFACTURING A HEAT TRANSFER TUBE

(71) Applicant: VALMET AB, Sundsvall (SE)

(72) Inventors: Lars Olausson, Angered (SE); Krister Pettersson, Stenungsund (SE); Martin Apel, Mölndal (SE); Mattias Gourdon, Gothenburg (SE); Anders Åkesjö, Gothenburg (SE)

(73) Assignee: VALMET AB, Sundsvall (SE)

( * ) Notice: Subject to any disclaimer, the term of this patent is extended or adjusted under 35 U.S.C. 154(b) by 0 days.

(21) Appl. No.: 16/481,553

(22) PCT Filed: Feb. 1, 2018

(86) PCT No.: PCT/SE2018/050082
§ 371 (c)(1),
(2) Date: Jul. 29, 2019

(87) PCT Pub. No.: WO2018/143880
PCT Pub. Date: Aug. 9, 2018

(65) Prior Publication Data
US 2019/0366228 A1    Dec. 5, 2019

(30) Foreign Application Priority Data
Feb. 3, 2017 (SE) .................... 1750094-3

(51) Int. Cl.
*B01D 1/06* (2006.01)
*B01D 1/30* (2006.01)
(Continued)

(52) U.S. Cl.
CPC ............ *B01D 1/065* (2013.01); *B01D 1/30* (2013.01); *B21D 22/02* (2013.01); *B21D 51/10* (2013.01);
(Continued)

(58) Field of Classification Search
CPC .......... B01D 1/065; B01D 1/30; B21D 22/02; B23K 11/0073; B23K 11/16; D21C 11/007; D21C 11/10; F28F 1/34
See application file for complete search history.

(56) References Cited

U.S. PATENT DOCUMENTS 3,826,304 A    7/1974  Withers et al.
4,251,907 A    2/1981  Bleckmann et al.
(Continued)

FOREIGN PATENT DOCUMENTS

CN    201145509 Y    11/2008
DE    36 43 794 C1    12/1987
(Continued)

OTHER PUBLICATIONS

USPTO Notice of Allowance, U.S. Appl. No. 16/481,551, dated Jul. 13, 2020, 12 pages.
(Continued)

*Primary Examiner* — Brian A McCaig
(74) *Attorney, Agent, or Firm* — Foley & Lardner LLP (57) ABSTRACT

The invention relates to a heat transfer tube (9) for falling film evaporation having a heating medium surface (21) to be heated by a heating medium, a falling film surface (20) to have spent liquor passing over it, and being made from an iron based high alloy stainless steel material with an alloy content above 16.00% for Chromium and above 1% for Nickel. The falling film surface of the heat transfer tube is equipped with at least one weld ridge (WR; $WR_1$, $WR_2$), said weld ridge having a height (h; $h_2$) in the range 0.3 to 5.0 mm, a width (w; $w_2$) in the range 0.5-15 mm, and an inclination angle ($\alpha$; $\alpha_1$, $\alpha_2$) versus a plane orthogonal to a longitudinal axis (CC) of the heat transfer tube in a range of 0-70 degrees so that each weld ridge is inclined and extends helically along at least a portion of the heat transfer tube or extend within a plane orthogonal to the longitudinal axis of (Continued)

the heat transfer tube and forms well ridge portions on the falling film surface such that the distance along the longitudinal axis of the heat transfer tube between adjacent weld ridge portions is within the range of 0 to 250 mm. The invention also relates to a method for manufacturing said heat transfer tube.

14 Claims, 9 Drawing Sheets

(51) Int. Cl.
*F28F 1/34* (2006.01)
*B21D 22/02* (2006.01)
*B21D 51/10* (2006.01)
*D21C 11/00* (2006.01)
*D21C 11/10* (2006.01)
*B23K 11/00* (2006.01)
*B23K 11/16* (2006.01)
*B23K 101/06* (2006.01)
*B23K 103/04* (2006.01)
*B23K 101/08* (2006.01)

(52) U.S. Cl.
CPC .......... *B23K 11/0073* (2013.01); *B23K 11/16* (2013.01); *D21C 11/0007* (2013.01); *D21C 11/10* (2013.01); *F28F 1/34* (2013.01); *B23K 2101/06* (2018.08); *B23K 2101/08* (2018.08); *B23K 2103/05* (2018.08); *F28F 2275/06* (2013.01)

(56) References Cited

U.S. PATENT DOCUMENTS

| | | | |
|---|---|---|---|
| 6,013,890 A | 1/2000 | Hulsizer | |
| 6,056,048 A | 5/2000 | Takahashi et al. | |
| 6,655,451 B2 | 12/2003 | Tada et al. | |
| 2003/0089489 A1* | 5/2003 | Tada ......................... | F28F 1/42 165/115 |
| 2012/0214017 A1 | 8/2012 | Murphy et al. | |
| 2015/0184845 A1* | 7/2015 | Lobscheid .............. | F22B 37/74 165/109.1 |

FOREIGN PATENT DOCUMENTS

| | | |
|---|---|---|
| JP | 58-084001 A | 5/1983 |
| WO | WO 96/01140 A1 | 1/1996 |
| WO | WO 96/32998 A1 | 10/1996 |

OTHER PUBLICATIONS

Extended European Search Report, Application No. 18747562.9, dated Mar. 16, 2020, 8 pages.
Extended European Search Report, Application No. 18748565.1, dated Mar. 16, 2020, 8 pages.
Extended European Search Report, Application No. 18748566.9, dated Mar. 19, 2020, 9 pages.
USPTO Office Action, U.S. Appl. No. 16/481,548, dated Aug. 27, 2020, 9 pages.
USPTO Office Action, U.S. Appl. No. 16/481,551, dated Oct. 20, 2020, 8 pages.
USPTO Notice of Allowance, U.S. Appl. No. 16/481,548, dated Nov. 25, 2020, 10 pages.
USPTO Notice of Allowance, U.S. Appl. No. 16/481,551, dated Dec. 4, 2020, 10 pages.

* cited by examiner

HEAT TRANSFER TUBE AND METHOD FOR MANUFACTURING A HEAT TRANSFER TUBE

TECHNICAL FIELD

The invention relates to a heat transfer tube for falling film evaporation of spent liquor. The heat transfer tube has a heating medium surface arranged to be heated by a heating medium, and a falling film surface opposite and facing away from said heating medium surface, which falling film surface is arranged to have spent liquor containing lignin and other dissolved components from cellulosic material and/or inorganics from the cellulosic material and chemicals used passing over it as a falling film while evaporating solvent (mainly water) from the falling film and thus increasing the dry matter content as well as viscosity. The heat transfer tube is made from a sheet metal material, e.g. an iron based high alloy stainless steel material with an alloy content above 16.00% for Chromium and above 1% for Nickel, preferably corresponding to corrosion resistant steel qualities at least like AISI 316 or AISI 304. The invention also relates to a method for manufacturing such a heat transfer tube as described above.

BACKGROUND

In the general technology area of improving heat transfer a multitude of designs for heat transfer surfaces have been proposed. However, improving heat transfer surfaces in evaporation stages for spent liquor in pulp mills has proven to be difficult. These liquids of biological origin often contain a high concentration of dry matter in the form of fiber residues, lignin and salts causing fouling and scaling in said evaporation stages. The dry matter content may in a first evaporation stage lie at 20% or more, and in final evaporation stages even reach 80% or more, before the spent liquor is burned in the recovery boiler. Hence, to prevent such formation of fouling and scaling, heat transfer tubes are predominantly equipped with smooth surfaces on the spent liquor side. However, even with such smooth surfaces it is often seen that precipitations are collected in the lower parts of said evaporation stages, requiring shut down and intensive cleaning actions. In what evaporation position of flow these precipitations occur, i.e. $1^{st}$-$2^{nd}$-$3^{rd}$-$4^{th}$-$5^{th}$-$6^{th}$ or $7^{th}$ evaporation effect in the evaporation train, depends upon the current concentration of different dry matter content, and that may shift from one mill to another depending upon chemical profiling of the processes used and type and origin of cellulosic material. In order to clean the heat transfer tubes, there is a need to wash the heat transfer tubes using rather tough cleaning methods such as high pressure cleaning equipment, steam cleaning or acid cleaning. Any modifications of the surfaces must be made in such a way that the heat transfer tubes may be washed while still allowing a functional cleaning of the tubes. In particular the surface modifications must be made such that they not will be destroyed or damaged to any greater extent from the cleaning operation.

OBJECT OF THE INVENTION

A first object of the invention is to provide an improved heat transfer tube for falling film evaporation of spent liquor containing lignin and other dissolved components from cellulosic material and/or inorganics from the cellulosic material and chemicals used.

A second object of the invention is to provide a method for manufacturing such a heat transfer tube.

Definitions

For the purpose of this disclosure, the term surface weld is a weld that is applied on a surface, which results in a semicircular or crescent shaped weld ridge on the smooth surface. A butt weld is a weld that is applied between two abutting plates and merge these plates into one common plate via said butt weld. The butt weld may be applied such that a semicircular or crescent shaped weld ridge is protruding from the weld seam. Both of these types of welds may be applied during a single pass or multipass welding operation, i.e. the weld is formed during one single pass or after applying several welds on top of each other.

Concerning weld ridges, it is generally considered that if there are ridges formed at separate locations on the envelope surface, separated in the longitudinal direction of the heat transfer tube, then these ridges are considered as separate ridges even though if they happen to be formed by the very same weld. For example, when a helically inclined weld crosses a line on the envelope surface parallel to the longitudinal axis of the heat transfer tube is each crossing point with the weld considered to be a separate ridge.

For the purpose of this disclosure, the term thin layer or falling film (of spent liquor) is a layer of spent liquor that preferably has a thickness of 1-10 mm, which flows over a heated surface and on the opposite side of the layer is exposed to a gaseous environment into which the solvent will evaporate. The spent liquor may, for example, be spent cooking liquor.

THE INVENTION

The first object of the invention is achieved with a heat transfer tube as initially described, wherein the falling film surface of the heat transfer tube is equipped with one or several welds forming a multitude of weld ridges. The weld ridges are spaced apart along the longitudinal axis of the heat transfer tube such that the distance along the longitudinal axis of the heat transfer tube between adjacent weld ridges is within the range of 0-250 mm. The weld ridges have a height, measured orthogonally to the falling film surface, in the range 0.3-5.0, more preferably 0.5-2.0 mm and most preferably 0.7-1.7 mm. Further on, the weld ridges have a width, measured along the falling film surface orthogonally to the longitudinal direction of the weld ridges, in the range 0.5-15 mm, more preferably 1-10 mm and most preferably 1.5-5 mm, and said weld ridges have an inclination angle versus a plane orthogonal to a longitudinal axis of the heat transfer tube in a range of 0-70 degrees. Hence, the weld ridges may be designed so that each weld ridge is inclined, e.g. having one or more continuous welds extending helically along a portion of the envelope surface of the heat transfer tube so as to form a multitude of inclined weld ridges along the longitudinal axis of the heat transfer tube. Similarly, a multitude of welds may form a discontinuous or dotted pattern of an overall helical shape also forming a multitude of inclined weld ridges along the longitudinal extension of the heat transfer tube.

Alternatively, welds could be made as an overall ring-shaped pattern, continuous or discontinuous, on the envelope surface of the heat transfer tube and the ring-shaped pattern may be inclined or extend within a plane orthogonal to the longitudinal axis of the heat transfer tube while forming well ridges on the falling film surface. It is also possible to have a multitude of short welds, either of the same lengths or different lengths, forming the weld ridges. Hence, there are a multitude of ways in designing the weld ridges such that the distance along the longitudinal axis of the heat transfer tube between adjacent weld ridge portions is within the range of 0 to 250 mm.

These weld ridges provide for a disturbance or turbulence in the thin film of spent cooking liquor that increases the heat transfer rate while introducing only a limited increase of stress in the material. This solution also ensures that the tubes are still accessible for steam or acid spraying lances for steam or acid cleaning. Also, the weld ridges require relatively small volumes of welding material.

The application area is of outmost importance for increasing energy efficiency in the evaporation train of a pulp mill, as about ⅓ of the total energy demand for a modern pulp mill is used in the evaporation plant. The total heating surface in the evaporation train in a modern but average pulp mill may exceed 50.000 $m^2$. If an existing evaporation train in a pulp mill needs to meet a higher capacity, when total volumes of spent cooking liquor to be evaporated increases as total production of pulp increases, this increased evaporation capacity may be met by surface modifications of the heat transfer surfaces in an already existing structure. If installed in a new evaporation plant the total installed heating surface may be decreased, enabling major cost reductions.

The heat transfer tubes in these applications are typically made from an iron based high alloy stainless steel material with an alloy content above 16.00% for Chromium and above 1% for Nickel, preferably corresponding to corrosion resistant steel qualities like AISI 316 or AISI 304 or better or Duplex. Said steel qualities are necessary to withstand the high alkali concentration in combination with high sulfidity concentration that may cause Stress Corrosion Cracking (SSC). AISI 316 has an alloy composition of Cr:16.00-18.00%, Ni:10.00-12.00%; Mo 2.00-2.50%; AISI 304 has an alloy composition of Cr:17.50-18.50%, Ni 8.00-10.00%; Lean Duplex/ASTM 532101 has an alloy composition of Cr:21.00-24.00%, Ni:1.00-5.50%; Mo0.10-0.60%; and Lean Duplex/ASTM 532304 has an alloy composition of Cr:21.00-25.00%, Ni:3.00-6.00%; Mo:0.1-0.6%. In these applications should excessive plastic deformation be kept at a minimum and such modifications are not suitable in general to be made on the tubes as such deformations may leave high stress forces in the material that may be difficult to release by heat treatment as the tubes most often are longer than available heating ovens.

The above described dimensions of the weld ridges (height and width) preferably apply to tube evaporators where the diameter of the tube is in the range 20-100 mm, even more preferably 40-60 mm, allowing easy application of said weld forming weld ridges also on or in finally shaped tubes but also on flat steel plates that later are shaped and welded to tubes (e.g. by butt welding via an axially running weld or butt welding via a spirally running weld).

The energy efficiency may be increased by up to 100% with these dimensions and orientations of the weld ridge(s), while still meeting the requirement of cleaning possibility if precipitation occurs on the heat transfer surfaces during evaporation of the passing thin layer of spent cooking liquor.

In a preferred embodiment of the invention the distance along the longitudinal axis of the heat transfer tube between adjacent weld ridge portions, i.e. between an upper edge of a lower weld ridge portion and a lower edge of an upper weld ridge portion, is in the range 2-50 mm, and even more preferably 5-20 mm. In general, the turbulence induced by the weld ridges will have an effect on the falling film for a distance of about 10 mm from where the turbulence is induced until the turbulent flow will be essentially laminar again. The specific distance is dependent on a lot of parameters such as the shape and height of the weld ridge, viscosity of the liquid film as well as the velocity in the flow why different distances between the weld ridges may be desired depending on these conditions. In their closest arrangement, the weld ridges will guarantee a thorough formation of turbulence in the thin film that never settles to a laminar flow. In their most distant arrangement, each weld ridge portion limits the length of the laminar flow that forms below a preceding weld ridge.

In a preferred embodiment of the invention the height of said weld ridge is in the range 0.5-2.0 mm. Keeping the height within this range limits the tubes exposure to heat stress from the welding operation and keeps costs down for additional welding material.

The height of the weld ridge may be higher in tubes fed with spent cooking liquor with higher dry matter content than in tubes for spent liquor with low dry matter content. For example, in a first evaporation effect where the spent liquor fed to the effect is 20% the height of the weld ridge may be about 0.5 mm as this may be sufficient to cause turbulence in the relative low viscosity conditions, while a later evaporation effect fed with spent liquor with dry matter content at 50% may have a height of the weld ridge about 2.0 mm as this may be required to cause turbulence at higher viscosity conditions.

In a preferred embodiment of the invention, the width of said weld ridge is in the range 0.5-15 mm, preferably 1-10 mm and even more preferably 1.5-5 mm. Keeping the width within this range has the advantage of inducing turbulence in the liquid film by disturbing the film flow.

In a preferred embodiment of the invention, the weld ridges are inclined in relation to a plane orthogonal to the longitudinal axis of the heat transfer tube and extends helically along at least a portion of the length of the heat transfer tube. The weld ridges are inclined with an angle below or equal to 70 degrees and preferably below or equal to 50 degrees. In some embodiments, the preferable inclination angle is within the range 1-15 degrees, and in other embodiments within the range 15-45 degrees. Such a weld ridge may be applied by a welding head that either revolves around the tube or rotates inside the tube while applying the weld ridge. In one alternative embodiment may at least two welds forming weld ridges be inclined and extend in parallel, which makes it possible to increase the angle of each weld, i.e. to change the pitch, while also increasing the distance, measured in the longitudinal direction of the tube, between weld ridges formed by the respective welds.

Another embodiment of the invention may include at least two weld ridges that are inclined in relation to the plane orthogonal to the longitudinal axis of the heat transfer tube and arranged crossing each other. Such intersecting weld ridges may improve the heat transfer rate as the falling film is forced to several direction changes, inducing turbulence.

Advantageously, said inclined weld ridges extend from one end of the heat transfer tube to the other end of the heat transfer tube.

In a further embodiment a weld ridge may extend within a plane orthogonal or inclined in relation to the longitudinal axis of the heat transfer tube. Advantageously, the weld ridges are formed by a circular weld on the falling film surface of the heat transfer tube. At least five parallel welds forming ridges may be applied to the falling film surface of the heat transfer tube. Advantageously, the distance between each weld ridge along the longitudinal axis of the heat transfer tube, i.e. between an upper edge of a lower weld ridge and a lower edge of an upper weld ridge, is within the range 0-250 mm, preferably 2-50 mm and even more preferably within the range 5-20 mm. The upper limit of the number of such circular welds applied is restricted by the total length of the tube and the distance between the weld ridges along the longitudinal axis of the heat transfer tube. In an embodiment of the invention is at least half the length of the heat exchanger tube along its longitudinal axis provided with weld ridges, and more preferably essentially the whole heat exchanger tube, provided with weld ridges at a distance from each other, i.e. between an upper edge of a lower weld ridge and a lower edge of an upper weld ridge, in the range of 3-50 mm and more preferably in the range of 5-20 mm.

In a preferred embodiment, at least one weld ridge forming weld is applied to the heating medium surface of the heat transfer tube, which heating medium surface is exposed to and heated by the heating medium. Such welds will increase the total area exposed to the heating medium, and thus the energy transferred from the heat medium.

A weld may be continuous, i.e. forming an unbroken row of weld ridges, or discontinuous, i.e. comprising a plurality of separate welds forming separated ridges arranged in line at a distance from one another.

A weld ridge may be formed by a surface weld applied directly on the heating medium or falling film surface, but may also be part of a butt fusion weld that is used to weld different parts of the tube together.

At least one surface of the heat transfer tube may be equipped with plastically formed grooves and/or protrusions. These grooves and protrusions advantageously extend between or crossing said weld ridges, but may also be used as alternative to said weld ridges. The protrusions advantageously have the same height (0.3-5.0 mm), width (0.5-15 mm), inclination angle (0-70 degrees) and spacing (0-250 mm) as the above described weld ridges. The grooves advantageously have a depth (0.3-5.0 mm), width (0.5-15 mm), inclination angle (0-70 degrees) and spacing (0-250 mm). The falling film surface is advantageously provided with protrusions, to create a disturbance in the thin film of spent cooking liquor, and the heating medium surface is advantageously provided with grooves, to increase the surface area exposed to the heating medium. These grooves and protrusions are suitably applied in or on the original stainless steel plate before rolling the plate to a tube since there will be more stress in the material if the grooves and protrusions are made after the tube is shaped.

At least one surface of the heat transfer tube may be equipped with pins with the same order of height (0.3-5.0 mm), width (0.5-15 mm), inclination (0-70 degrees) and spacing (0-250 mm) as the above described weld ridges. Such pins are advantageously applied in tube evaporators where the heating medium used is clean steam.

The above described protrusions, grooves and pins introduce only a limited increase of stress in the material, so that stress corrosion cracking is avoided.

The heat transfer tube according to the invention is suitable for spent liquor with dry matter content above 0.5%, and even more suitable for spent liquor with dry matter content within a range 15-50%.

The heat transfer tube according to the invention is particularly suitable for vertical falling film evaporators.

The invention also relates to a method for manufacturing a heat transfer tube as described above having a heating medium surface and a falling film surface manufactured from a sheet metal material. The method comprises the step of applying one or several welds forming a multitude of weld ridges to the falling film surface of the heat transfer tube. The weld ridges are spaced apart along the longitudinal axis (CC) of the heat transfer tube such that the distance along the longitudinal axis of the heat transfer tube between adjacent weld ridges is within the range of 0-250 mm. The weld ridges have a height in the range 0.3-5.0 mm, a width (w; w2) in the range 0.5-15 mm and an inclination angle ($\alpha$; $\alpha1$, $\alpha2$) versus a plane orthogonal to a longitudinal axis (CC) of the heat transfer tube (9) in a range of 0-70 degrees.

According to one method, one or several surface welds forming a multitude of weld ridges may be applied on a surface of an assembled heat transfer tube, as a service modification of heat transfer tubes in existing evaporation stages. If the thin film of spent liquor is flowing on the outside of the tube, like in FIGS. 1a and 1b, could a swiveling welding head mounted around the tube be used. The swiveling welding head may then be driven axially along the tube while rotating such that the surface weld is applied. If the thin film of spent liquor is flowing on the inside of the tube, like in FIG. 2, could a rotating welding head extending into the tube be used.

In an alternative method for manufacturing the heat transfer tube may the one or several surface welds forming a multitude of weld ridges be applied on a surface while forming a planar steel strip into a tube. By integrating the application of the weld during the tube forming operation could total work hours for modified tubes be kept at the same order as for unmodified tubes.

In yet an alternative method for manufacturing the heat transfer tube may one or several surface welds forming a multitude of weld ridges be applied on at least one side of a planar steel strip before form shaping the strip to a tubular form and welding the edges of the steel strip together with a butt fusion weld. The application of the surface weld on the planar steel strip would enable usage of standard welding machines.

It is also possible to apply one or several surface welds forming a multitude of weld ridges on a surface of a steel strip while form shaping the planar steel strip to a tubular form by spiral shaping the planar steel strip and welding the edges of the steel strip together with a butt fusion weld, wherein the weld ridges are formed integrated with said butt fusion weld. This is preferably done by controlling the feed of the welding head as it passes over the butt weld to be formed.

DRAWINGS

The figures show preferred embodiments of the invention, wherein

FIG. 4a shows a second embodiment of the inventive surface modification of the heat transfer tube with multiple parallel and continuous surface welds applied, with an enlarged part shown in FIG. 4b;

FIG. 5a shows a third embodiment of the inventive surface modification of the heat transfer tube with both a continuous surface weld and a crossing butt weld, with an enlarged part shown in FIG. 5b and FIG. 5c showing a cross section of the butt weld applied;

FIG. 7a shows a fifth embodiment of the inventive surface modification of the heat transfer tube with a butt weld applied and the surrounding surface equipped with ridges as shown in cross section in FIG. 7b.

DETAILED DESCRIPTION

Throughout this description, a heating medium surface is a surface arranged to be heated by a heating medium, whereas a falling film surface is a surface arranged to have spent liquor passing over it as a falling film.

Figures 1A, 1B:
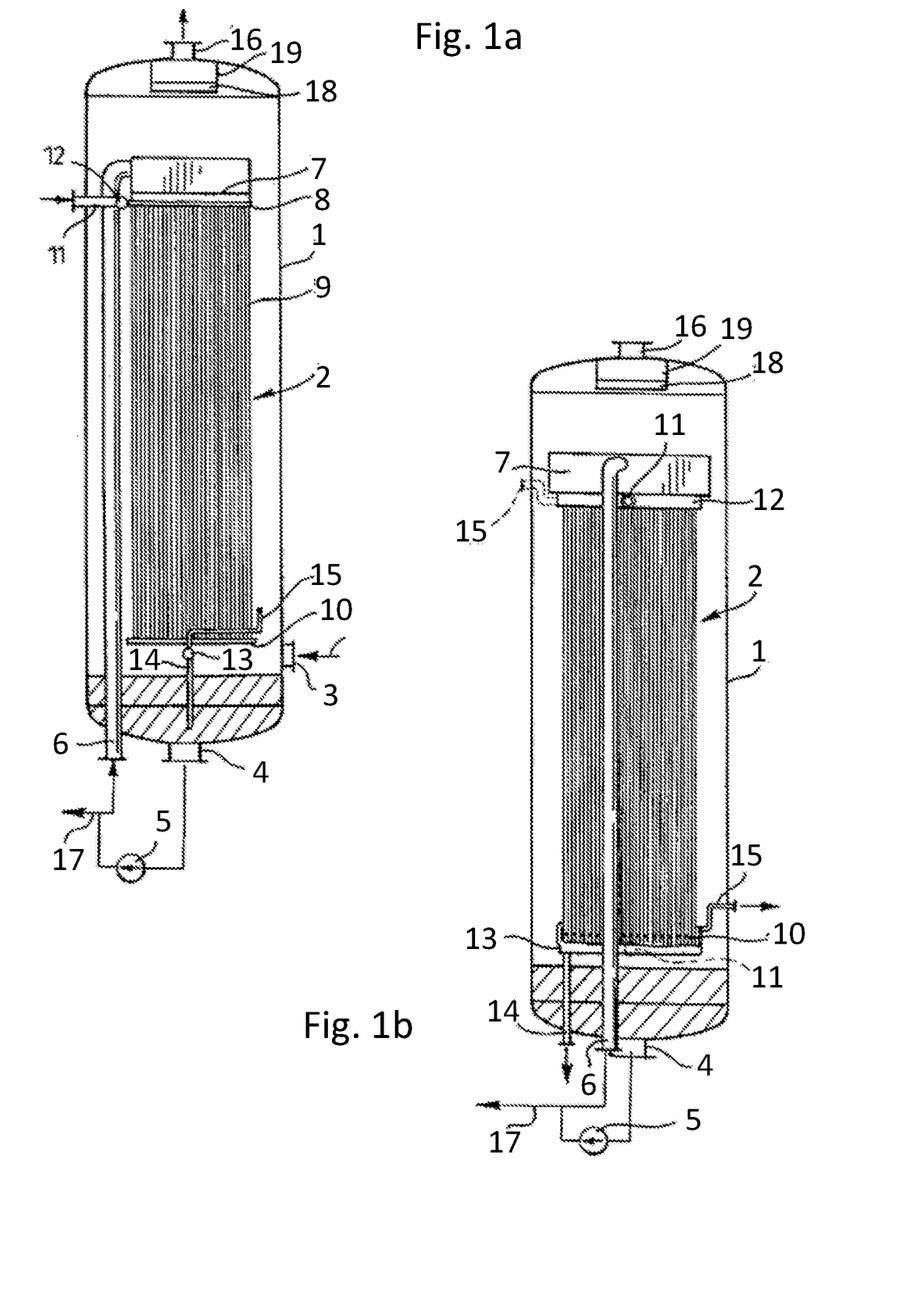
FIGS. 1a and 1b shows in orthogonal cross section views a tube evaporator where spent liquor flows as a thin film on the outer surface of the heat transfer tubes.

FIGS. 1a and 1b illustrate schematically a tube evaporator for evaporating spent liquor. The evaporator comprises a shell 1 containing a set 2 with multiple heat transfer tubes 9 arranged vertically in the shell 1.

FIG. 1 is seen in a cross-sectional view through the shell 1, with the heat transfer tubes 9 exposed. FIG. 1b is also seen in a cross-sectional view through the shell 1, but seen from the left-hand side of FIG. 1a. A liquid to be concentrated, in this case spent liquor, is fed through an inlet connection 3 into the shell 1, to the bottom thereof forming a volume of liquid with the surface level below the tubes 9. Liquor is discharged from the bottom of the evaporator through an outlet connection 4 and part of it is pumped by means of a schematically shown pump 5 through a circulating tube 6 into a distributing basin 7 above the set 2, from which basin it flows substantially evenly on steam distribution chambers 8 of the evaporating elements and from there further along outer falling film surfaces of separate heat transfer tubes 9 downwards. At the lower end of the heat transfer tubes 9, the concentrated spent liquor flows along the outer surface of steam collecting chambers 10 and falls subsequently into the liquor in the lower part of the shell 1 and mixes therewith.

To provide evaporation, vapor is led through the heat transfer tubes 9, and it is at first fed in through an inlet channel 11 in the upper part of the set 2 to steam distribution chambers 8 connected to upper parts of the heat transfer tubes 9. From there the vapor enters firstly a connecting chamber 12, which is connected to the upper collecting chambers 8 of the evaporating elements, so that the vapor is distributed through these evenly to all heat transfer tubes 9. Correspondingly, the remaining part of the vapor and condensate are collected, after having passed downwards along inner heating medium surfaces of the heat transfer tubes 9, in the steam collecting chambers 10 of the lower end of the evaporating elements, these collecting chambers being connected to a lower connecting chamber 13. From the lower part of the lower connecting chamber 13 starts an outlet channel 14 for condensate, through which channel the condensate is discharged, and respectively, from the upper part of the connecting chamber 13 starts an outlet channel 15 for vapor, through which channel the remaining heating vapor is exhausted. The water evaporated from the spent liquor under the influence of heating is exhausted as vapor through an outlet connection 16 at the upper end of the shell 1, and respectively, the concentrated liquor is bled off from the recirculation through a pipe 17. Inside the evaporator, in front of the outlet connection 16, there is further a mist separator 18 in such a way that water or liquor drops possibly contained in the exhaust vapor is caught on the mist separator and led back downwards. The mist separator is mounted to be enclosed by a closed housing 19 on each side so that all exhaust vapor must flow through the mist separator 18.

Figure 2:
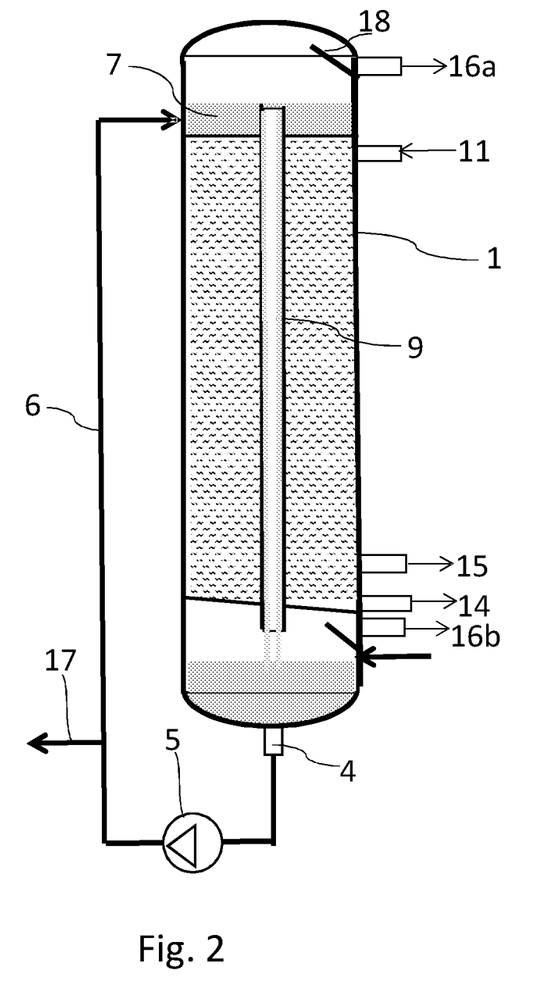
FIG. 2 shows schematically an alternative tube evaporator wherein spent liquor flows as a thin film on the inner surface of the heat transfer tubes.

FIG. 2 illustrate schematically an alternative tube evaporator for evaporating spent liquor, with the difference that the spent liquor is flowing as a thin film on an inner falling film surface of the heat transfer tube. Details with same function as those shown in FIGS. 1 and 2 is given the same reference number. FIG. 2 is seen in a cross-sectional view through the shell 1, with only one of the heat transfer tubes 9 exposed. In a real evaporator are several tubes arranged in parallel, with a distance of about 1-4 centimeter between neighboring heat transfer tubes 9, and with a tube diameter in the range 2-10 centimeter. A spent liquor to be concentrated is fed through the shell 1, to the bottom thereof forming a volume of spent liquor with the surface level below the heat transfer tubes 9. Spent liquor is discharged from the bottom of the evaporator through an outlet connection 4 and part of it is pumped by means of a schematically shown pump 5 through a circulating tube 6 into a distributing basin 7. From the upper surface level of the basin is spent liquor flowing over the upper edge of the tube and onto the inner falling film surface of the heat transfer tube 9 as a thin film and further downwards. At the lower end of the heat transfer tube 9, the concentrated spent liquor falls into the volume of liquid. While flowing as a thin film over the inner falling film surface of the heat transfer tube 9 is the tube heated by a heating medium at the outer heating medium surface of the heat transfer tube 9, and the film is thus exposed to evaporation during passage. Heating media is supplied via inlet channel 11, and in the lower end is residual steam extracted via outlet channel 15 and clean steam condensate is drained off via outlet channel 14. The dirty steam evaporated from the spent liquor may be bled off via upper outlet connection 16a and lower outlet connection 16b, and preferably are condensate deflectors/mists separator 18 used. The concentrated liquor is bled off from the recirculation through a pipe 17. It should be noted that the heating media may also be steam evaporated from other evaporation stages, and in such cases would the condensate collected in outlet channel 14 not be classified as clean water, instead dirty condensate containing turpentine or other liquids that has a condensation temperature close to that established in the heating media chamber.

The invention may be used on both types of tube evaporators, i.e. where the spent liquor flows as a thin film on an outer falling film surface of the heat transfer tube, as shown in FIGS. 1a and 1b, and where the spent liquor flows as a thin film on an inner falling film surface of the heat transfer tube, as shown in FIG. 2.

Figure 3A:
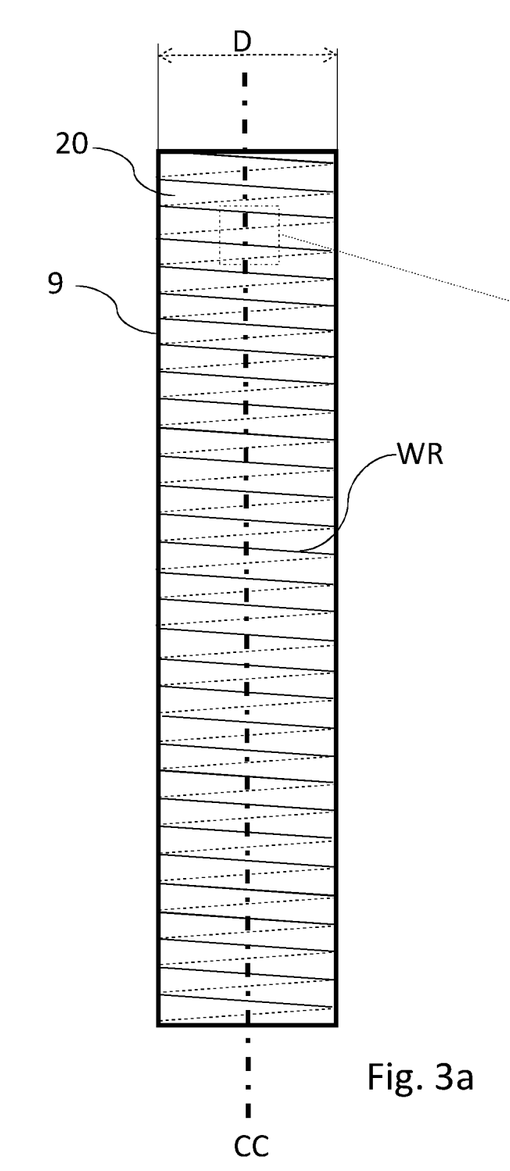
FIG. 3a shows a first embodiment of the inventive surface modification of the heat transfer tube with a single continuous surface weld applied, with an enlarged part shown in FIG. 3b, and FIG. 3c showing a cross section of the surface weld applied.
Figure 3B:
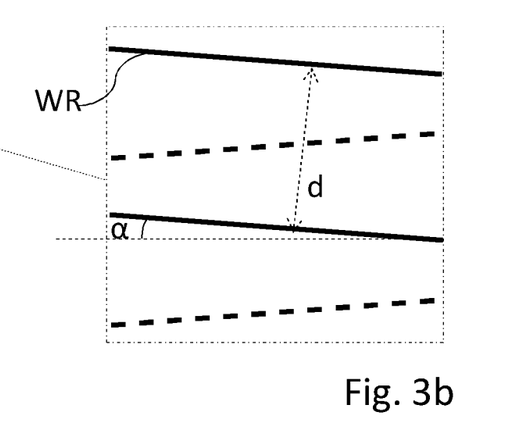
Figure 3C:
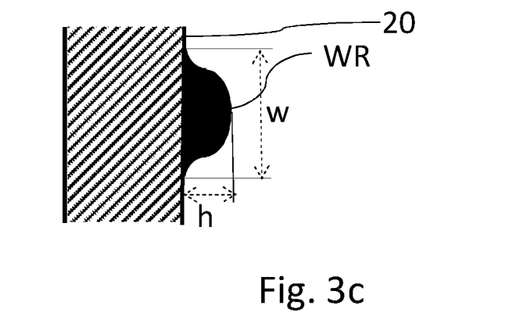

In FIG. 3a is a first embodiment of a heat transfer tube 9 according to the invention shown. In this case is a continuous surface weld applied on an outer falling film surface 20 of the heat transfer tube 9 and forming a multitude of weld ridges spaced apart along the longitudinal axis of the heat transfer tube. It should be understood that the surface weld may be applied instead on the inner surface of a heat transfer tube, if the thin film of spent cooking liquor flows on said inner surface. FIG. 3b shows an enlarged portion of FIG. 3a, and FIG. 3c a detailed cross section of the surface weld.

In the figures is:
CC the longitudinal axis of the heat transfer tube 9;
d the distance between adjacent weld ridges WR perpendicular to the longitudinal extension of the weld forming the weld ridges WR;
α the inclination angle of the weld ridges WR versus a plane orthogonal to the center axis CC of the heat transfer tube 9, in this embodiment close to 15 degrees;
The distance between adjacent weld ridges along the longitudinal axis is d divided by cos α
h the height of said weld ridges WR, measured orthogonally to the falling film surface 20, preferably in the range 0.3-5.0 mm; and
w the width of said weld ridges WR, measured in the same plane as the falling film surface 20 and orthogonally to the longitudinal direction of the weld ridges WR, preferably in the range 0.5-15 mm.

Figures 4A, 4B:
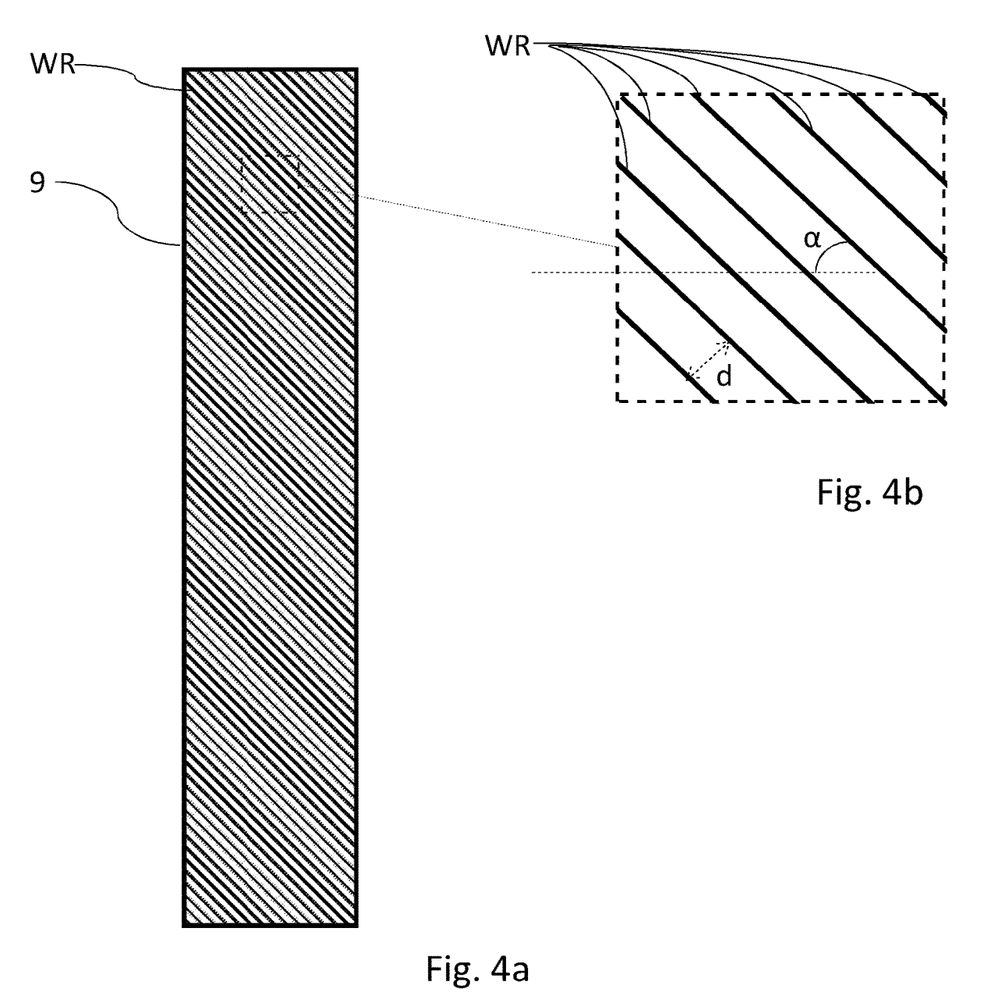

FIG. 4a shows a second embodiment of the heat transfer tube 9 according to the invention, with multiple surface welds applied to form parallel and continuous weld ridges WR. FIG. 4b shows an enlarged part of the heat transfer tube, wherein:
d is the distance between adjacent weld ridges WR perpendicular to the longitudinal extension direction of the welds forming the weld ridges WR,
α is the inclination angle of the weld ridges WR versus a plane orthogonal to the center axis CC of the heat transfer tube 9, in this embodiment about 45 degrees.
The distance between adjacent weld ridges in a direction parallel to the longitudinal axis CC is calculated as d divided by cos α

Figures 5A, 5B, 5C:
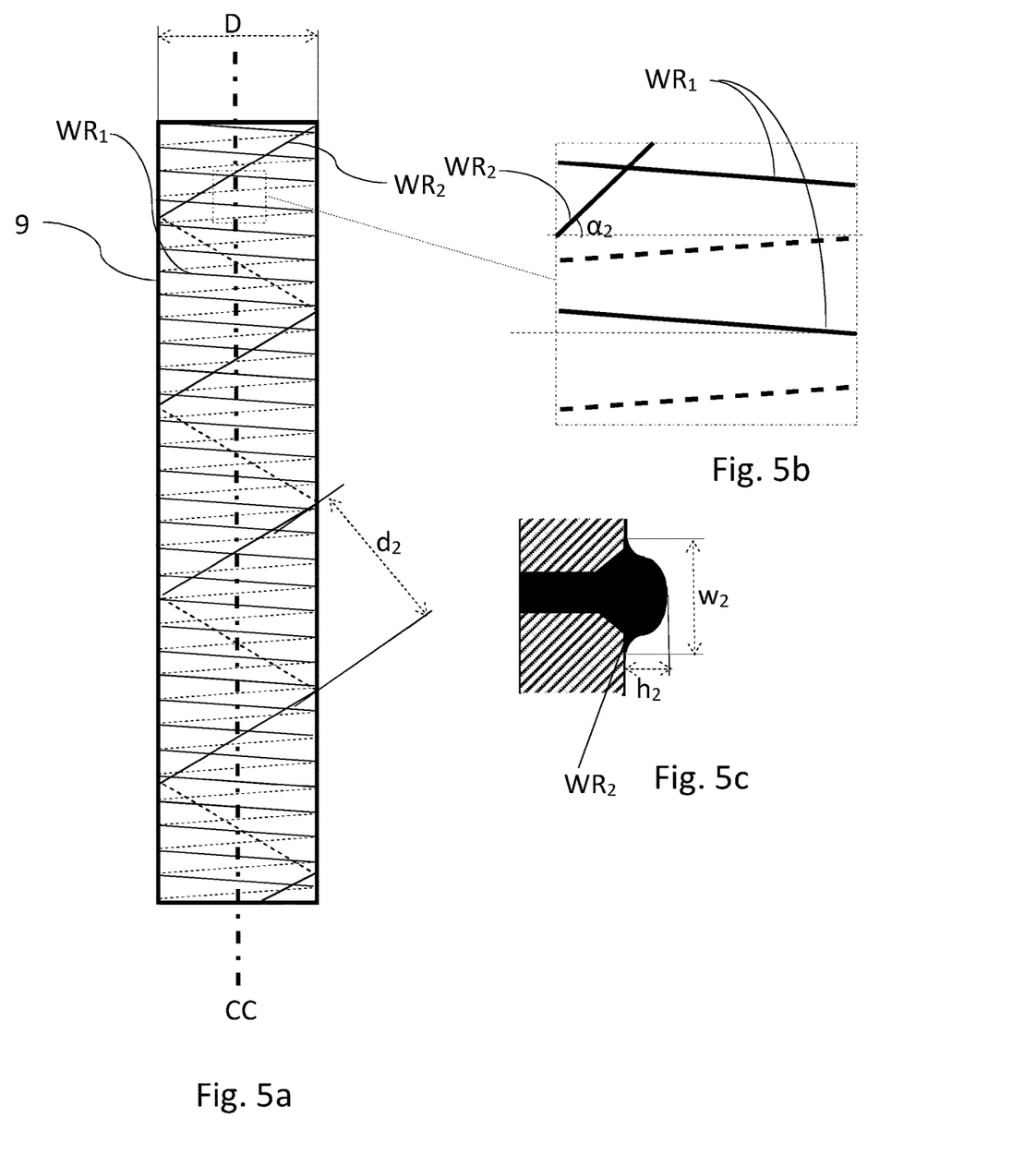

FIG. 5a shows a third embodiment of the heat transfer tube 9 according to the invention. A surface weld forms a multitude of first kind of weld ridges $WR_1$, identical to the weld ridges WR shown in FIG. 3a, and a crossing butt weld forms a multitude of protruding second weld ridges $WR_2$. FIG. 5b shows an enlarged part of the heat transfer tube 9, and FIG. 5c shows a cross section through one of the second kind of weld ridges $WR_2$. The height $h_2$ and width $w_2$ of the second kind of weld ridges $WR_2$ are of the same magnitude as for the first kind of weld ridge $WR_1$, whereas the inclination angle $\alpha_2$ is somewhat steeper for the second kind of weld ridges $WR_2$ and the distance $d_2$ between adjacent second kind of weld ridges $WR_2$ perpendicular to the longitudinal extension direction of the welds forming the weld ridges $WR_2$ is longer. The distance between adjacent weld ridges along the longitudinal axis is $d_2$ divided by cos $\alpha_2$.

Figure 6A:
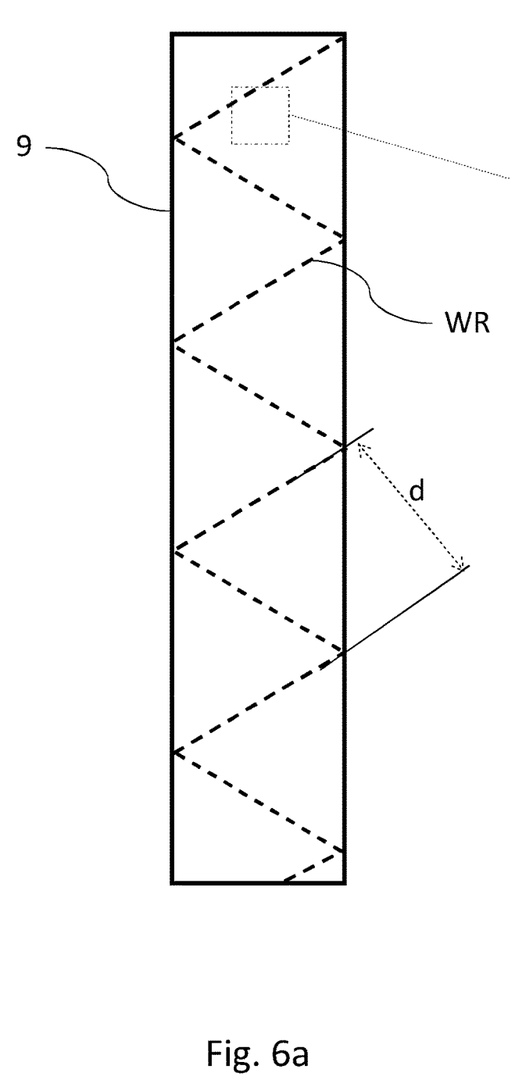
FIG. 6a shows a fourth embodiment of the inventive surface modification of the heat transfer tube with only a single continuous butt weld applied, with an enlarged part shown in FIG. 6b and FIG. 6c showing a cross section of the butt weld applied.
Figure 6B:
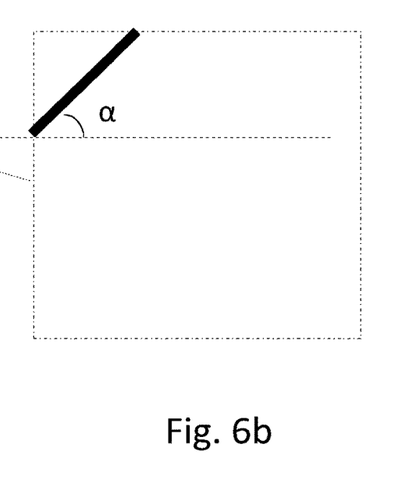
Figure 6C:
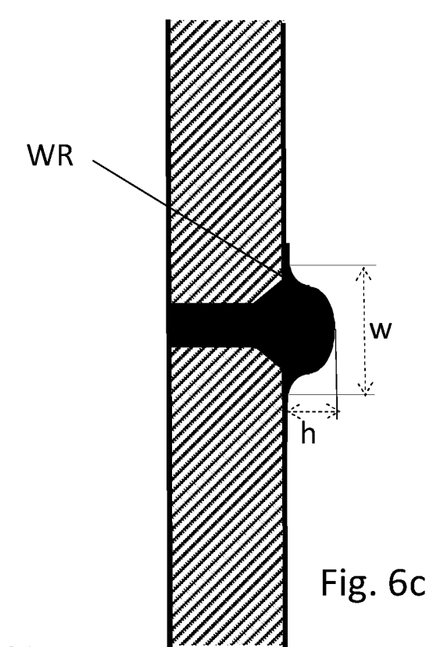

FIG. 6a shows a fourth embodiment of the inventive surface modification of the heat transfer tube 9 with only a single continuous butt weld forming a multitude of weld ridges WR with an enlarged part shown in FIG. 6b disclosing the inclination angle α and FIG. 6c showing a cross section of the butt weld. A spirally running metal strip has been butt welded to form said heat transfer tube 9. Consequently, the distance d between adjacent weld ridges WR is equal to the width of the metal strip. However, the distance between adjacent weld ridges along the longitudinal axis of the heat transfer tube is calculated as d divided by cos α. The weld ridges WR are formed on an inner falling film surface of the heat transfer tube 9.

Figures 7A, 7B:
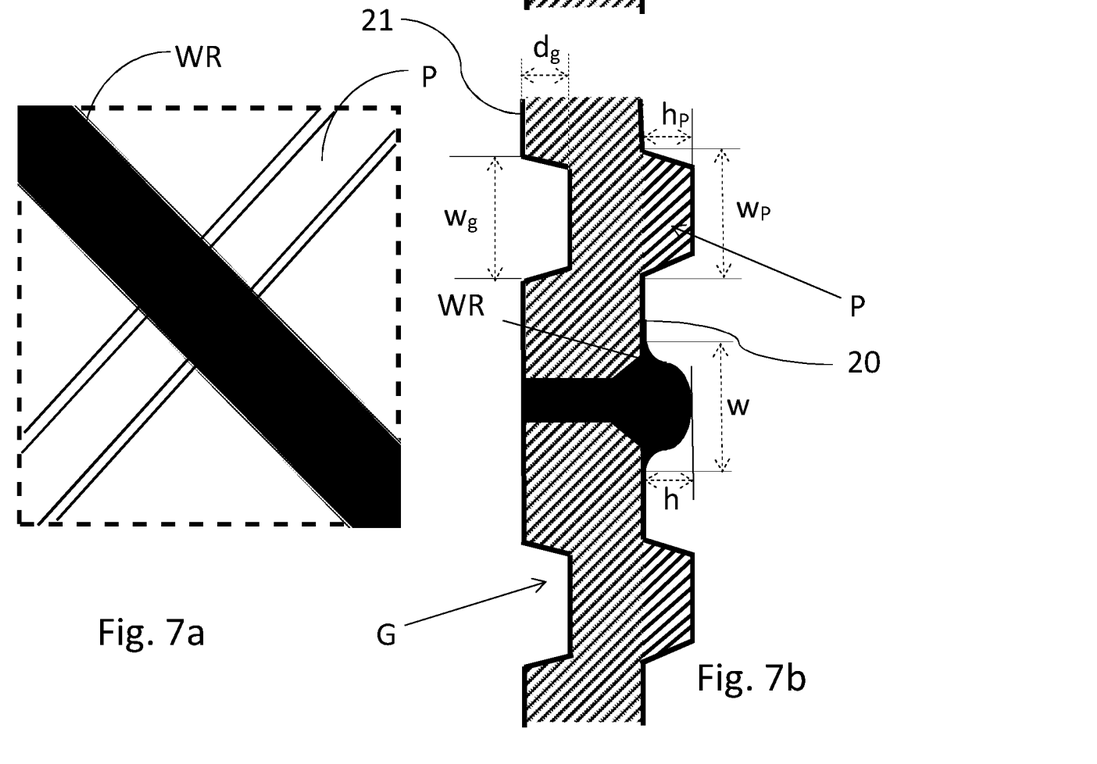

FIG. 7a shows a fifth embodiment of the heat transfer tube 9 according to the invention with a butt weld forming weld ridges WR at a falling film surface 20. The falling film surface 20 is also equipped with protrusions P and an opposite heating medium surface 21 is provided with corresponding grooves G. The protrusions P and grooves G extend orthogonally to said weld ridge WR on opposite sides of the heat transfer tube 9, as shown in cross section in FIG. 7b. The grooves and ridges are preferably formed with a trapezoidal cross section with sharp radius in corners, i.e. preferably with a radius less than 2 mm, and advantageously have the same height $h_p$ (ridges) and depth $d_g$ (grooves) and width $w_p$, $w_g$ as the height h and width w of the weld ridge WR.

Figure 7C:
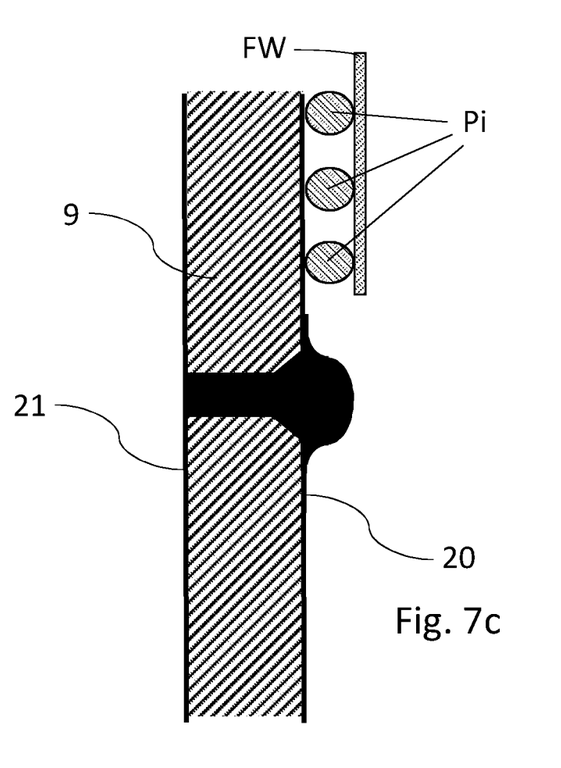
FIG. 7c showing supplemental pins arranged on the falling film surface of the heat transfer tube.

FIG. 7c shows a sixth embodiment of the invention, wherein supplemental pins Pi are arranged on the falling film surface 20 of the heat transfer tube 9. The pins may be butt fusion welded to said falling film surface 20. Pins may additionally or alternatively be arranged on the heating medium surface 21 to increase the surface area exposed to the heating medium. The pins Pi may be arranged in a net by means of thin fixation wires FW, fixing the distance between pins at equidistant distance between neighboring pins, before attaching the net on the surface by butt fusion welding. The pins Pi may be built from spirally wound wire.

Figure 8A:
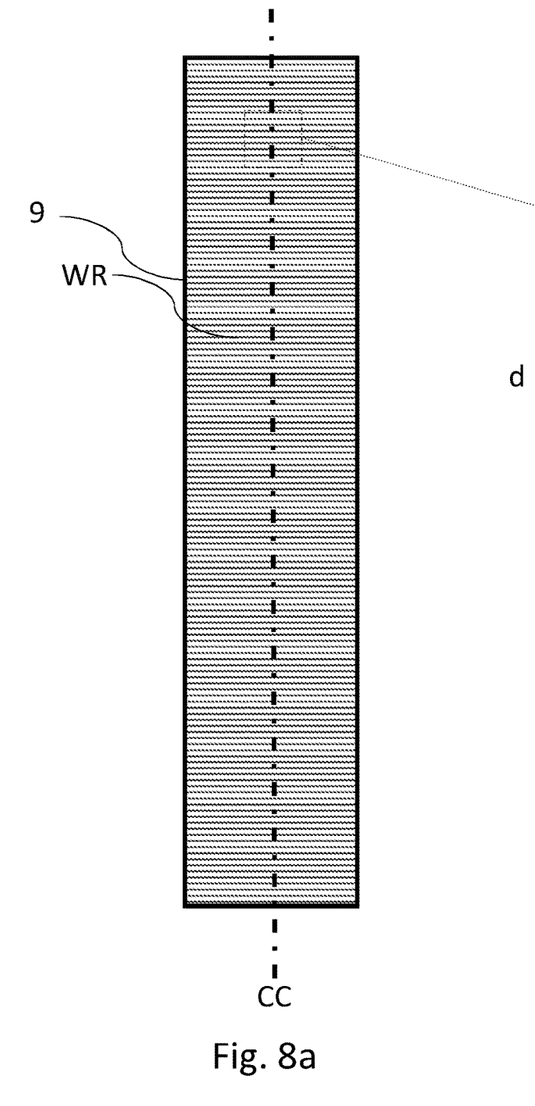
FIG. 8a-c show a sixth embodiment of the inventive surface modification of the heat transfer tube with a multitude of closed circular surface welds applied, all arranged orthogonal to the longitudinal axis of the tube.
Figure 8B:
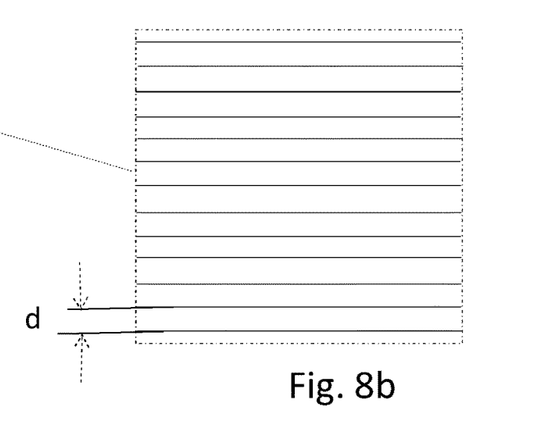
Figure 8C:
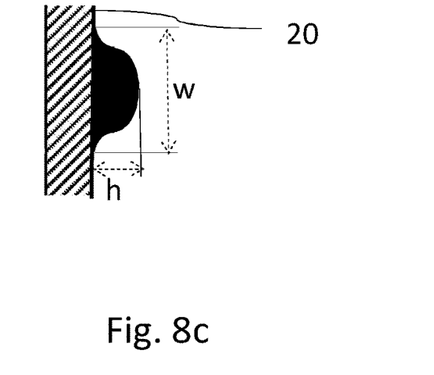

FIG. 8a-c show a seventh embodiment of the heat transfer tube 9 according to the invention, wherein a multitude of closed circular surface welds forming weld ridges WR are applied to the outer falling film surface 20 of the heat transfer tube. All weld ridges WR are arranged orthogonal to the longitudinal axis CC of the heat transfer tube 9. The weld ridges are thus formed by welds forming closed circular rings, with a multitude of welded rings applied over the surface; and with
a distance d between adjacent weld ridge portions WR perpendicular to the longitudinal extension direction of the welds forming the weld ridges WR,
a height h, preferably in the range 0.3 to 5.0 mm; and
a width w, preferably in the range 0.5-15 mm.

In this case will thus the distance between adjacent weld ridges along the longitudinal axis of the heat transfer tube be the same as d since the distance is calculated as d divided by cos α, α=0 and cos α=1.

The scope of protection is not limited to the above described embodiments. The skilled person understands that the embodiments can be modified and combined in many different ways without parting from the scope of the invention. For example, the weld ridges, protrusions, grooves and pins in the figures may be discontinuous and they may be arranged on any of the inner and outer surfaces of the heat transfer tubes.

The invention claimed is:
1. A heat transfer tube for falling film evaporation of spent liquor, the heat transfer tube having:
a heating medium surface configured to be heated by a heating medium; and
a falling film surface opposite and facing away from the heating medium surface, the falling film surface configured to have spent liquor pass over the falling film surface as a falling film and configured to evaporate solvent from the falling film;
wherein the heat transfer tube comprises a steel sheet material,
wherein the falling film surface of the heat transfer tube is equipped with one or more welds forming a multitude of weld ridges spaced apart along a longitudinal axis of the heat transfer tube such that a distance along the longitudinal axis of the heat transfer tube between adjacent weld ridges is within the range of 2-50 mm, wherein the weld ridges have a height in the range of 0.3-5.0 mm, a width in the range of 0.5-15 mm, and an inclination angle versus an orthogonal plane that is orthogonal to a longitudinal axis of the heat transfer tube in a range of 0-70 degrees.

2. The heat transfer tube according to claim 1 wherein the distance along the longitudinal axis of the heat transfer tube between adjacent weld ridges is in the range 5-20 mm.

3. The heat transfer tube according to claim 1, wherein the height of the weld ridges are in the range 0.5-2.0 mm.

4. The heat transfer tube according to claim 1, wherein the weld ridges are inclined in relation to the orthogonal plane.

5. The heat transfer tube according to claim 4, wherein at least two weld ridges are inclined in relation to the orthogonal plane and arranged to cross each other.

6. The heat transfer tube according to claim 1, wherein each weld ridge extends from the falling film surface within the orthogonal plane.

7. The heat transfer tube according to claim 1, wherein at least one weld ridge is applied on the heating medium surface of the heat transfer tube.

8. The heat transfer tube according to claim 1, wherein the falling film surface of the heat transfer tube is equipped with plastically formed protrusions.

9. The heat transfer tube according to claim 1, wherein the falling film surface of the heat transfer tube is equipped with pins.

10. Method for manufacturing a heat transfer tube for falling film evaporation of spent liquor, which method comprises the step of assembling the heat transfer tube having:
   a heating medium surface configured to be heated by a heating medium;
   a falling film surface opposite and facing away from the heating medium surface, the falling film surface configured to have spent liquor containing lignin and other dissolved components from cellulosic material and/or inorganics from cellulosic material and chemicals used pass over the falling film surface as a falling film and configured to evaporate solvent from the falling film, the heat transfer tube being made from a sheet metal material,
   wherein the method comprises the step of applying one or more welds forming a multitude of weld ridges to the falling film surface of the heat transfer tube spaced apart along a longitudinal axis of the heat transfer tube such that a distance along the longitudinal axis of the heat transfer tube between adjacent weld ridges is within the range of greater than 0 mm and less than or equal to 250 mm, the weld ridges have a height in the range 0.3-5.0 mm, a width in the range 0.5-15 mm, and an inclination angle versus a plane orthogonal to a longitudinal axis of the heat transfer tube in a range of 0-70 degrees.

11. The method for manufacturing the heat transfer tube according to claim 10, wherein the method comprises the step of applying the one or more welds forming the weld ridges on the falling film surface of an assembled heat transfer tube.

12. The method for manufacturing the heat transfer tube according to claim 10, wherein the method comprises the step of applying the one or more welds forming the weld ridges on the falling film surface while forming a planar steel strip into the heat transfer tube.

13. The method for manufacturing the heat transfer tube according to claim 10, wherein the method comprises the step of applying the one or more welds forming the weld ridges on the falling film surface of a planar steel strip before form shaping the strip to a tubular form and welding the edges of the steel strip together with a butt fusion weld.

14. The method for manufacturing the heat transfer tube according to claim 10, wherein the method comprises the step of applying the one or more welds forming the weld ridges on the falling film surface of a planar steel strip while form shaping the planar steel strip to a tubular form by spiral shaping the planar steel strip and welding the edges of the steel strip together with a butt fusion weld, wherein the weld ridges are formed integrated with said butt fusion weld.

* * * * *